Aug. 29, 1950  E. S. DIEHL  2,520,385
ANIMAL CONFINING MEANS
Filed Oct. 28, 1944  2 Sheets-Sheet 1
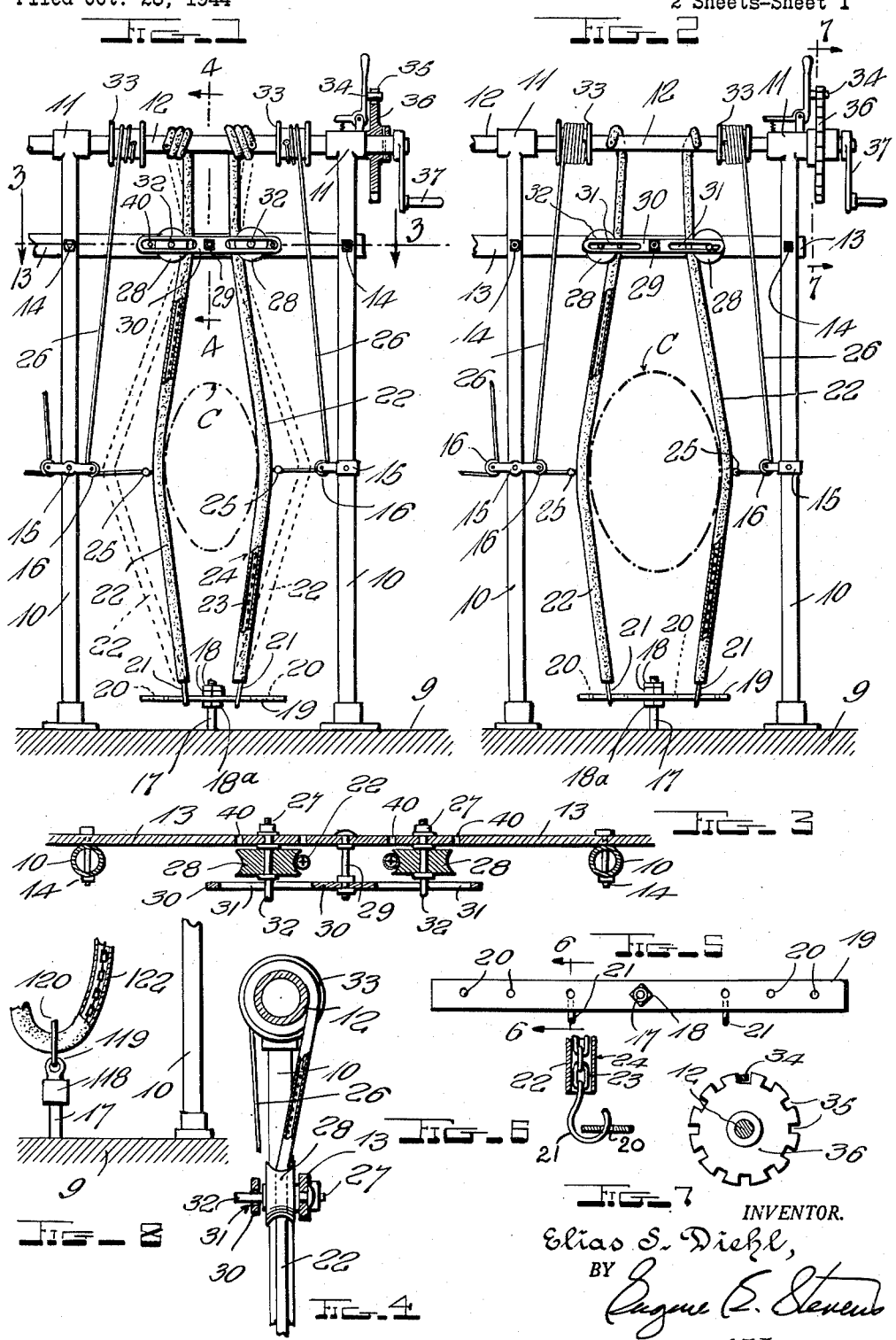
INVENTOR.
Elias S. Diehl,
BY Eugene C. Stevens
Attorney

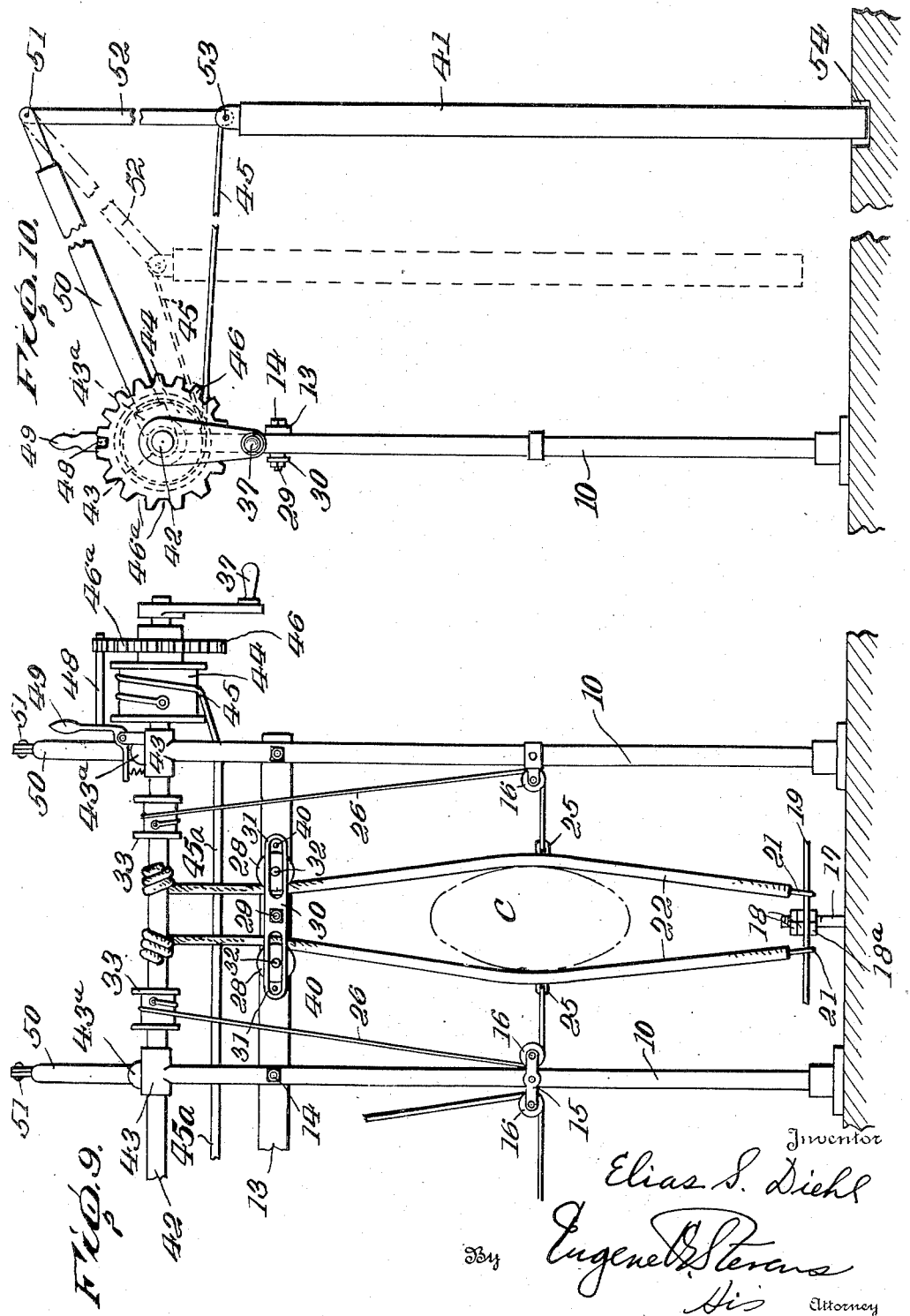

Patented Aug. 29, 1950

2,520,385

UNITED STATES PATENT OFFICE 2,520,385

ANIMAL CONFINING MEANS

Elias Stanley Diehl, Bedford, Pa.

Application October 28, 1944, Serial No. 560,855

7 Claims. (Cl. 119—148)

My invention relates to means for maintaining dairy cows in position for milking.

One phase of the invention has to do with novel stanchion means for securing the cow at the manger while in another phase it deals with shiftable means for maintaining the cow's hind quarters substantially aligned with the manger. Said stanchion means and said shiftable means are preferably used conjointly, and when so used have a common mounting means and are controlled by a common actuating means, which moves them to and from operative position.

The invention resides in certain novel features of construction, combination and arrangement of the various parts, and in modes of operation, the advantages of all of which will be readily understood and appreciated by dairymen and others from a reading of the following detailed description of certain examples of my inventive concept which are disclosed in the accompanying drawings.

It should be understood, however, that the drawing disclosures are to be considered as illustrative, rather than limitative, it being obvious that the invention in its various phases is susceptible of various mechanical expressions within the spirit and scope of the appended claims.

In the drawing:

Fig. 1 is a front elevation, partly in section, of a stanchion incorporating my invention;

Fig. 2 is a like view of the Fig. 1 disclosure, but showing the stanchion adjusted to fit a larger animal;

Fig. 3 is a horizontal section taken on the plane of the line 3—3 of Fig. 1;

Fig. 4 is a fragmentary vertical section taken on the plane of the line 4—4 of Fig. 1;

Fig. 5 is a fragmentary plan view of a detail, parts being shown in horizontal section;

Fig. 6 is a fragmentary vertical section taken on the plane of the line 6—6 of Fig. 5;

Fig. 7 is a vertical section on the line 7—7 of Fig. 2; and an elevation of a detail, parts being shown in vertical section;

Fig. 8 is a fragmentary elevation with parts in section of a modification of the lower stanchion-securing means.

Fig. 9 is a front elevational view of a modification of the stanchion means of Figs. 1 and 2, but incorporating shiftable stall-defining part elements carried by a portion of the stanchion means and operated by its actuating means; and Fig. 10 is a side elevational view of Fig. 9.

Referring specifically to Figs. 1–7, inclusive, of the drawing, 9 designates the base or floor just rearwardly of the usual manger (not shown) of a dairy barn, which is divided, at the manger into what might be termed stalls, by the usual upright members 10.

For the purpose of convenience but a single stall has been shown, but it is understood that as many as necessary may be added. At the upper end of each member 10 there is provided a bearing 11. The bearings 11 are in axial alignment and rotatably mount a shaft 12. A short distance below the shaft 12, an elongated support 13 is fixedly secured to the uprights 10 by any suitable means 14. Substantially midway between the support 13 and the floor 9 suitable means 15 mount opposed pulleys 16 whereby each stall is provided with a pair of pulleys. The base 9, intermediate each pair of uprights 10 has set therein the usual rod 17 to which the stanchion members 22 are attached. A nut 18a is threaded on the end of the rod 17 and provides a support for a plate 19 which is rotatably mounted on the rod 17. Removal of the plate 19 is prevented by a pair of lock nuts 18 which are threaded on the rod above the plate. The plate 19 on either side of the rod 17 is provided with a plurality of longitudinally spaced holes 20. The holes 20 are adapted to receive hooks or other connecting means 21 on the lower ends of flexible stanchion members 22 which take the form of leather covered chains. The upper ends of the flexible stanchion members 22 are fixedly attached to the shaft 12 so that they will be wrapped therearound as the shaft is rotated in one direction and unwound therefrom when the shaft is rotated in the opposite direction, whereby to tighten and slacken the members 22.

The shaft 12 has fixed thereon a plurality of spaced spools or drums 33, two being provided for each stall and so located that one is adjacent each upright 10. Each drum 33 has fixed thereto one end of a cable or other flexible member 26. The opposite end of each cable 26 is threaded through one of the pulleys 16 and is attached to an intermediate point of the corresponding flexible member 22 by any suitable means at 25. The cables 26 are wound around the spools 33 in a direction opposite to the winding of the members 22, whereby the cables 26 will be tightened as wound on the drums 33 and the members 22 loosened as unwound from the shaft 12 when the shaft 12 is rotated in one direction and vice versa.

The support member 13, intermediate each pair of uprights 10, is provided with a plurality of longitudinally spaced holes 40. A pair of bolts or the like 27 are passed through selected ones of the holes 40 and mount thereon spools or other rotatable guide members 28 for the stanchion members 22. An intermediate bolt or like member 29 mounts a plate or like keeper member 30, having a pair of aligned horizontal slots 31 for receiving the free ends 32 of the bolts 27. The keeper 30 prevents escape of the stanchion members 22 from the guides 28 and the guides insure proper spacing of the stanchion members 22 at their upper ends. It follows from this structure and from the foregoing description of the member 19 and associated structure that the upper and lower portions of the flexible stanchion members 22 may be adjustably spaced from each other to accommodate animals of different size. Thus, in Fig. 2, the stanchion members are adjusted to accommodate a larger animal than is the case in Fig. 1.

The operation of the device is readily apparent from the foregoing and may be summarized as follows: Assuming the stalls are empty, the stanchion members 22 are in the broken line position of Fig. 1 and are locked in such position by the engagement of the laterally extending pin of the horizontally pivoted dog 34 in the notches 35 of a suitable clutch member 36. When the animals enter the stalls they naturally extend their heads between the uprights 19 to get at the feed in the manger which is forwardly of the floor portion 9. This action automatically positions the necks C of the animals between the stanchion members 22, as shown. The operator can now fasten all the animals in their stalls by releasing the dog 34 and rotating the shaft 12 by the handle 37 in a counter-clockwise direction. This simultaneously loosens the cables 26 and tightens the stanchion members 22 whereby they assume the solid line positions of Figs. 1 and 2. The horizontally swingable mounting of the lower member 19 and the inherent flexibility of the stanchion members 22 permit free movement of the animal in the stall but, at the same time, prevent the escape of the animal. The flexibility of the stanchion members 22 reduces the possibility of callouses or the like being formed on the animal, and, also permits the stanchion members 22 to be opened much wider than is possible with the usual rigid stanchion members. To release the animals, the dog 34 is again disengaged and the shaft 12 is rotated in a clockwise direction which returns the stanchion members to the broken line position.

A modification of the device is seen in Fig. 8, wherein the rod member 17 is provided with a cap 118 having an eye 119 formed thereon to receive a ring 120. A flexible stanchion member 122 is passed through the ring 120 and is slidable therein. Aside from this bottom connection of the stanchion to the base 9, the remainder of the modification is exactly like that of the first described form in both structure and operation.

In Figures 9 and 10, I incorporate with the stanchion of Figs. 1–7, means in the form of laterally spaced simultaneously controlled partition posts 41 there being one such carried by and substantially aligned with each stall-defining post 10. The partition posts 41 and their mounting and control means being identical, description thereof will be in the singular. A partition post 41, in its operative Fig. 10 position, is located at a point at least mid-way the length of the cow on either her right or left side, for preventing shifting of her hind quarters sidewise during milking. Except as to details of the operating shaft (12 of Figs. 1 and 2) its carrying bearings, locking and actuating means the Figs. 9 and 10 stanchion disclosure is identical with the Figs. 1 and 2 showing thereof, and consequently the same reference characters have been employed to designate corresponding parts.

As shown in Figs. 9 and 10, the shaft 42, which corresponds to shaft 12 of Figs. 1 and 2, is extended beyond its rightmost bearing 43 (corresponding to 11 in Figs. 1 and 2) to receive the drum 44 upon which is received and wound the partition-post control cable 45.

Outwardly of drum 44 is keyed the notched disk, or clutch element 46 similar to element 36 of Figs. 1 and 2. Shaft 42 is operated by crank 37 and the dog 48 of pivoted lever 49 is adapted to engage notches 46a of disk 46. (See 34, 36—Figs. 1 and 2.)

As shown in Figs. 9 and 10, shaft bearings 43 take the form of a T and the preferably integral upwardly and rearwardly slanting tubular stem portions 43a thereof carry the extension arms 50. To the outer ends of extension arms 50 are pivoted, as at 51, the depending links 52 whose lower ends provide the pivot support 53 for the bifurcated upper end bearing of post 41.

As best shown in Fig. 10, cable 45 passes rearwardly from drum 44 to engagement with the lower link pivot 53. The pivot 53 may, and preferably does, take the form of an elongated rod so as to provide pivot connection between adjacent link 52 and post 41 assemblies, as suggested in Fig. 9. Cable 45 is so wound upon drum 44 that when shaft 42 is rotated to move stanchion portions 22 to the dotted line position of Fig. 1, the lower end of the partition post will be lifted out of the slightly elongated floor-provided receiving recess 54 and swung upwardly and rearwardly to the out-of-the-way position adjacent the stanchion posts 10, as shown in dotted lines in Fig. 10. And, of course, it naturally follows that when stanchion members 22 are being operated to retain a cow's head, the post members will be moved to the full line position of Fig. 10.

Thus, it is intended that there shall be two posts 41 for each stall which are spaced substantially in alignment with the posts 10. The posts 41 are all connected to the horizontal bar 45a and the cable 45 is connected as at the right hand side as seen in Fig. 9 to said horizontal bar 45a, whereby upon operation of the drum 44 and cable 45 the bar 45a is moved to lift the plurality of posts 41 to either the dotted or full line positions as seen in Fig. 10, in which, of course, only the post 41 at the extreme right hand end is shown.

When the partition posts assume the dotted line position of Fig. 10, the cows, having been simultaneously released from stanchion means 22 can simply pull their heads rearwardly, and in the same movement turn and move toward the barnyard door without encountering any obstructions.

Having thus described my invention what I claim is:

1. Animal confining means for barns and the like comprising in combination, a pair of spaced substantially vertically disposed neck-retaining members, means including a rotatable, horizontally disposed shaft adjacent the upper ends of said members for actuating the same to and from operative position; a carrier bearing for said shaft disposed laterally and outwardly of each of said neck retaining members, a rearwardly and upwardly extending support carried by said bearing, animal space-defining means carried by said supports and movable to and from operative position, and operating means for said space-defining means carried by said shaft.

2. The combination set forth in claim 1, and said animal space-defining means being in the form of a depending link-carried post, and the operating means therefor including a flexible shaft-carried connection.

3. Animal retaining means for dairy barns or the like, comprising a pair of substantially vertically disposed and flexible neck gripping members, means anchoring the lower ends of said members, rotatable means anchoring the upper ends of said members in laterally spaced relation, said last named means being adapted to tighten said members when rotated in one direction and loosen said members when rotated in the opposite direction, spreading means for each of said neck-gripping members and comprising an outwardly acting flexible connection operatively connected to said members intermediate the ends of the latter and to said rotatable anchoring means to spread said members when said rotatable anchoring means is rotated in a member loosening direction, and a direction changing guide means for each of said flexible connections.

4. The structure of claim 3, and guide means for neck-gripping flexible members between said intermediate portions thereof and the upper ends, said guide means being operatively connected to said flexible connections and adjustable towards and away from each other to vary the spacing of said first named flexible members.

5. Animal confining means for cows or other animals in a barn comprising spaced upstanding supports adapted to be carried by the floor or the like adjacent a manger, bearings carried at the upper ends of said supports, a rotatable shaft mounted in said bearings, actuating means for said shaft, locking means therefor, upwardly and rearwardly extending bars carried by said shaft bearings, an animal-space defining member movably carried by each of said bars, and actuating means carried by said shaft for moving said space-defining members to and from operative position.

6. The combination set forth in claim 5, and each of said space defining members comprising a post, a link pivoted adjacent one end to the associated bar and pivoted adjacent the other end to said post, and said shaft carried actuating means for said post including a flexible connection.

7. The combination set forth in claim 5, and each of said space defining members comprising a post, a link pivoted adjacent one end to the associated bar and pivoted adjacent the other end to said post, said shaft carried actuating means for said post including a flexible connection, and means connecting said post-link assemblies for simultaneous movement.

ELIAS STANLEY DIEHL.

REFERENCES CITED

The following references are of record in the file of this patent:

UNITED STATES PATENTS

| Number | Name | Date |
| --- | --- | --- |
| 288,335 | Hicks | Nov. 13, 1883 |
| 786,350 | Ferris | Apr. 4, 1905 |
| 852,439 | Lattin | May 7, 1907 |
| 999,958 | Champion | Aug. 8, 1911 |
| 1,009,807 | Titrud | Nov. 28, 1911 |
| 1,099,623 | Sletten | June 9, 1914 |
| 1,186,514 | James | June 6, 1916 |
| 1,641,810 | Gutenkunst | Sept. 6, 1927 |
| 1,676,568 | McCandless | July 10, 1928 |
| 1,797,159 | Shafer | Mar. 17, 1931 |
| 1,867,722 | Wille | July 19, 1932 |

FOREIGN PATENTS

| Number | Country | Date |
| --- | --- | --- |
| 570,430 | France | Jan. 16, 1924 |
| 458,671 | Germany | Apr. 17, 1928 |
| 61,839 | Norway | Jan. 2, 1940 |